US008773730B2

(12) United States Patent
Gu et al.

(10) Patent No.: US 8,773,730 B2
(45) Date of Patent: Jul. 8, 2014

(54) SCAN ASSISTING FIXING DEVICE AND SCANNER USING THE SAME

(75) Inventors: Yun-Bin Gu, Suzhou (CN); Yong-Xiang Yi, Suzhou (CN); Zhi-Hai Zhang, Suzhou (CN); Jian-Chun Yu, Suzhou (CN); Hong-Peng Li, Suzhou (CN); Ming-Jie Zhao, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 554 days.

(21) Appl. No.: 13/113,094

(22) Filed: May 23, 2011

(65) Prior Publication Data

US 2011/0317226 A1 Dec. 29, 2011

(30) Foreign Application Priority Data

Jun. 24, 2010 (CN) .......................... 2010 1 0220605

(51) Int. Cl.
*H04N 1/04* (2006.01)

(52) U.S. Cl.
USPC ........... 358/474; 358/487; 358/496; 358/498; 358/506; 358/497; 348/75; 348/96; 348/110; 353/95; 353/108; 353/103; 355/75; 355/18

(58) Field of Classification Search
None
See application file for complete search history.

(56) References Cited

U.S. PATENT DOCUMENTS

| | | | | |
|---|---|---|---|---|
| 5,754,314 | A | 5/1998 | Araki et al. | |
| 6,426,808 | B1 * | 7/2002 | Seo | 358/498 |

FOREIGN PATENT DOCUMENTS

| | | |
|---|---|---|
| CN | 1755518 | 4/2006 |
| JP | 10327346 | 12/1998 |

OTHER PUBLICATIONS

Machine translation of Japanese Pat. Pub. H10-327346 to Iizuka, published Dec. 8, 1998.*

* cited by examiner

*Primary Examiner* — Paul F Payer

(57) ABSTRACT

A scan assisting fixing device and a scanner using the same are provided. The fixing device is for fixing an object to be scanned, which includes a scanning portion and a holding portion. The fixing device includes an accommodation region, a scan window and a protrusion portion. When the holding portion is loaded in the accommodation region, the scanning portion correspondingly disposed in the scan window is retained and fixed by the protrusion portion, and the position of the holding portion in the fixing device is constant, so that the scanning portion is always within the range of the field depth of the scanner regardless of the specification of the positive film holder, and the clarity of the scanned image is assured.

18 Claims, 8 Drawing Sheets

300
100
102
3041
1011
3112
311
305
301
Z
302
3111
Y
X
3042

SCAN ASSISTING FIXING DEVICE AND SCANNER USING THE SAME

This application claims the benefit of People's Republic of China application Ser. No. 201010220605.3, filed Jun. 24, 2010, the subject matter of which is incorporated herein by reference.

BACKGROUND OF THE INVENTION

1. Field of the Invention

The invention relates in general to a scan assisting fixing device, and more particularly to a fixing device applicable to a scanning element with small field depth and a scanner using the same.

2. Description of the Related Art

The slides (positive films) have been widely used in many occasions such as business meetings, seminars or classes. Mostly, the positive films are realized by transparent thin films made from soft materials. Therefore, before the positive films are delivered from the factory, some positive film manufacturers normally use a positive film holder to enclose and protect the soft positive film as indicated in FIGS. 1A-1B. The positive film holder 100 includes a positive film 101 and a holding portion 102, wherein the positive film 101 is surrounded by the holding portion 102 and the to-be-scanned portion 1011 of the positive film 101 is exposed.

The positive film holders manufactured by different positive film manufacturers may have different specifications. In general, the thickness of the positive film holders currently available in the market may range between 1.0~3.5 mm. The difference in the thickness of the positive film holder may cause problem when a positive films enclosed with a positive film holder is scanned.

Referring to FIG. 2, a diagram of an existing scanner scanning a positive film is shown. As indicated in the diagram, the scanner 20 includes a scanning element 200, which can be realized by a contact image sensor (CIS). The scanning element 200 has an imaging element (such as a lens) 201. The positive film holder 100 for scanning passes through a set of transmission rollers 202 to enter the scanner 200. Herein after, the distance from the imaging element 201 to the scan plane (the plane on which the positive film 101 is located) of the positive film holder 100 is referred as distance d. When scanning the positive film holders with different thicknesses, the variation range of the distance d may exceed the range of the field depth of the imaging element 201, so that the imaging element 201 cannot be focused clearly and the quality of the scanned image is unstable.

One of the commonly used methods is to remove the positive film from the positive film holder first, then the removed positive film is inserted into another auxiliary equipment and loaded into the scanner for scanning. However, the positive film may be damaged or spoiled during the process of removing the positive film from the positive film holder. Furthermore, such operation is inconvenient.

SUMMARY OF THE INVENTION

The invention is directed to a scan assisting fixing device, on which an object to-be-scanned (such as a positive film holder) with different thicknesses can be loaded. Furthermore, regardless of the thickness of the positive film holder, the fixing device assures that the position of the scan plane (such as a positive film) remain unchanged in the fixing device. Therefore, when the fixing device is disposed in a scanner, the distance from the imaging element of the scanning element to the scan plane is almost constant so that the scanned image can meet superior quality.

The invention provides a scan assisting fixing device for fixing an object to be scanned, which includes a scanning portion and a holding portion. The fixing device includes an accommodation region, a scan window and a protrusion portion. The accommodation region is for accommodating the holding portion. The scan window is disposed in the accommodation region for accommodating the scanning portion. The protrusion portion is disposed in the scan window for positioning the scanning portion in the first direction perpendicular to the scan plane.

According to the fixing device of the invention, the fixing device has a first casing and a second casing arranged together to form the accommodation region. The first casing has a first opening. The second casing has a second opening. The first opening and the second opening are stacked to form the scan window.

According to the fixing device of the invention, the protrusion portion includes a first positioning portion disposed at the edge of the second opening. When the holding portion is loaded in the accommodation region, the scanning portion is correspondingly disposed in the scan window and positioned by the first positioning portion in the first direction.

Furthermore, the protrusion portion further includes a second positioning portion disposed at the edge of the first opening. When the holding portion is loaded in the accommodation region, the scanning portion correspondingly disposed in the scan window is retained and fixed by the first positioning portion and the second positioning portion.

Furthermore, the first positioning portion and the second casing are elastically connected for enabling the first positioning portion to be adjustable along the first direction.

Furthermore, there is an elastic element disposed on a side of the first casing and within the accommodation region, and when the holding portion is loaded in the accommodation region, the elastic element elastically presses the holding portion.

According to the fixing device of the invention, one side of the first casing is rotatably fixed on the second casing. Or, the first casing is detachably disposed on the second casing. Or, the first casing is slidably disposed on the second casing. Or, the first casing and the second casing are integrally formed in one piece, and there is a slot disposed on one lateral side of the fixing device through which the object is inserted into the fixing device along the scan plane.

According to the fixing device of the invention, the protrusion portion is made from an elastic material.

According to the fixing device of the invention, the scanning portion is a positive film, and the holding portion is a positive film holder for protecting the positive film.

The invention further provides a scanner, which includes a scanning element and the said fixing device. The scanning element can selectively scan a first object and a second object. The first object includes a first scanning portion and a first holding portion. The second object includes a second scanning portion and a second holding portion, and the thickness of the first holding portion is not equal to that of the second holding portion. When the fixing device fixes the first object, the first holding portion is loaded in the accommodation region and positioned by the protrusion portion in a first direction, and the scan plane of the first object is separated from the scanning element by a first distance in the first direction. When the fixing device fixes the second object, the second holding portion is loaded in the accommodation region, the second scanning portion is positioned by the protrusion portion in the first direction, and the scan plane of the second object is separated from the scanning element by a second distance in the first direction. The first distance and the second distance are both within the range of the field depth of the scanning element.

When the scan assisting fixing device of the invention is used for the scanner to scan objects with different thicknesses, the scan assisting fixing device can assure that the distance from the scan plane to the scan imaging surface is close to a constant. In other words, such distance is always within the range of the field depth of the scanner, so that the scanner with small field depth still can obtain scanned images with stable quality, and can therefore be used in a wider range. Furthermore, when scanning a object such as a slide, the fixing device of the invention enables film holders with different thicknesses to be loaded into the fixing device and starts scanning accordingly without unloading the original film holder, which is convenient to the user and protective to the object.

The above and other aspects of the invention will become better understood with regard to the following detailed description of the exemplary but non-limiting embodiment(s). The following description is made with reference to the accompanying drawings.

DETAILED DESCRIPTION OF THE INVENTION

Figure 1A:
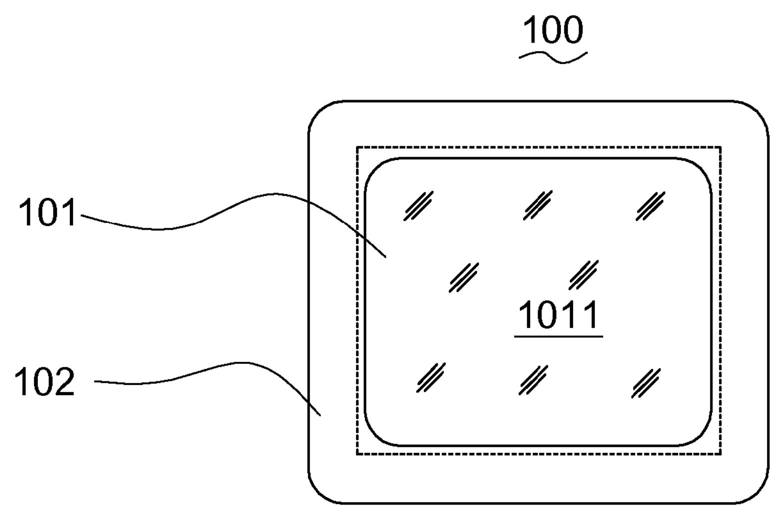
FIGS. 1A-1B shows a diagram of an existing positive film holder according to the prior art.
Figure 1B:
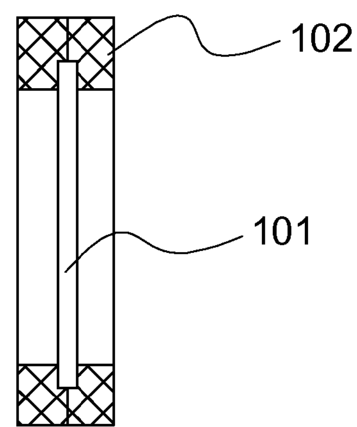
Figure 2:
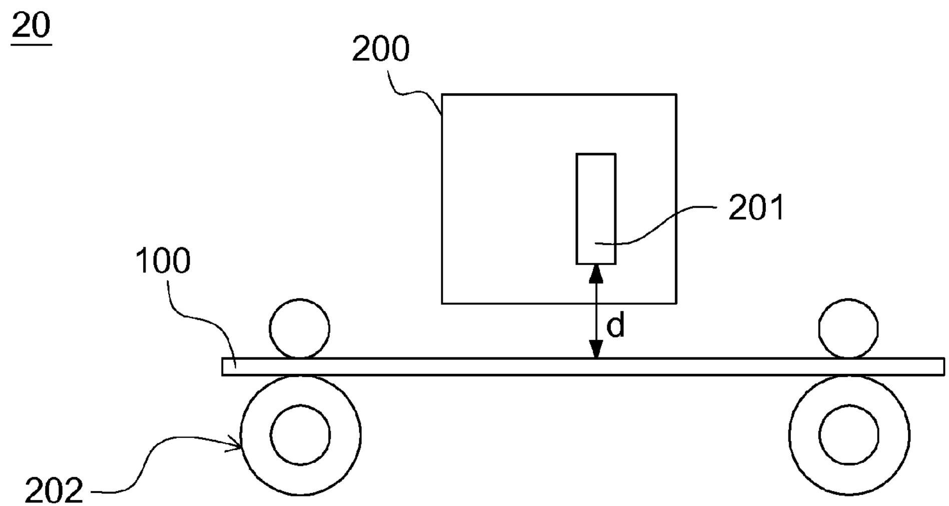
FIG. 2 shows a diagram of an existing scanner scanning a positive film according to the prior art.
Figure 3A:
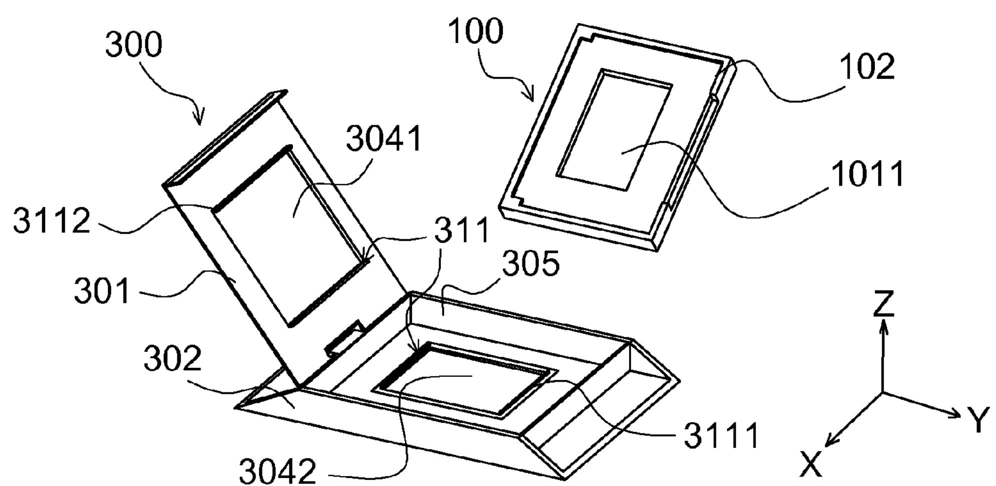
FIG. 3A shows a diagram of a fixing device according to an embodiment of the invention.
Figure 3B:
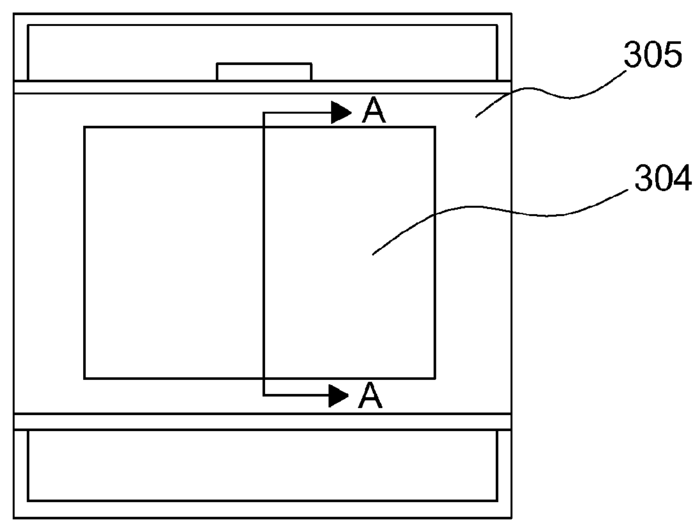
FIG. 3B shows a top view of a fixing device according to an embodiment of the invention.

The invention provides a scan assisting fixing device for fixing a to-be-scanned object, which includes a to-be-scanned portion and a holding portion. Referring to FIGS. 3A-3B. FIG. 3A shows a diagram of a fixing device according to an embodiment of the invention. FIG. 3B shows a top view of a fixing device according to an embodiment of the invention. The fixing device 300 includes an accommodation region 305, a scan window 304 and a protrusion portion 311. The accommodation region 305 is for accommodating a holding portion 102 of an object 100 to be scanned. The scan window 304 is disposed in the accommodation region 305 for accommodating a scanning portion 1011 of the object 100. The protrusion portion 311 is disposed in the scan window 304 for positioning the scanning portion 1011 in a first direction Z perpendicular to the scan plane (the X-Y plane of FIG. 3A). The scan plane is the plane on which the scanning portion 1011 is located after the object 100 is loaded into the fixing device 300.

In an embodiment, the fixing device 300 has a first casing 301 and a second casing 302, which arranged to form an accommodation region 305. The first casing 301 has a first opening 3041. The second casing 302 has a second opening 3042. The first opening 3041 and the second opening 3042 are stacked to form a scan window 304. The protrusion portion 311 includes a first positioning portion 3111 disposed at the edge of the second opening 3042. When the holding portion 102 is loaded in the accommodation region 305, the scanning portion 1011 is correspondingly disposed in the scan window 304 and positioned by the first positioning portion 3111 in the first direction Z. Preferably, the first positioning portion 3111 and the second casing 302 are elastically connected so that the first positioning portion 3111 is adjustable along the first direction Z.

Let the scanning portion be a positive film, and let the holding portion be a positive film holder for protecting the positive film. After the positive film holder 100 is loaded into the fixing device 300, the holding portion 102 of the positive film holder 100 is loaded in the accommodation region 305 and restricted by the first casing 301 and the second casing 302. The positive film 1011 is located in the scan window 304. Meanwhile, the first positioning portion 3111 exactly supports the peripheral of the positive film 1011, so that the positive film 1011 is positioned.

In order to position the scanning portion 1011, the protrusion portion 311 further includes a second positioning portion 3112 disposed at the edge of the first opening 3041. When the holding portion 102 is loaded in the accommodation region 305, the scanning portion 1011 correspondingly disposed in the scan window 304 is retained and fixed by the first positioning portion 3111 and the second positioning portion 3112. Such fixing method by retaining two sides directly is applicable to objects with larger areas or made from soft materials, and has higher accuracy positioning. It is to be understood that the positions of the first positioning portion 3111 and the second positioning portion 3112 of the present embodiment minimize the interference in the scan area of the scanning portion 1011 caused by the fixing device, and other structures capable of retaining the scanning portion 1011 are also within the scope of protection of the invention.

In the present embodiment, the fixing device 300, being a rectangular frame structure, includes an accommodation region 305, a scan window 304 located within the accommodation region 305, and a protrusion portion 311 located on the peripheral of the scan window 304. The first positioning portion 3111 can be disposed on a pair of opposite edges of the second opening 3042. However, the invention is not limited to the above exemplifications.

Figure 4:
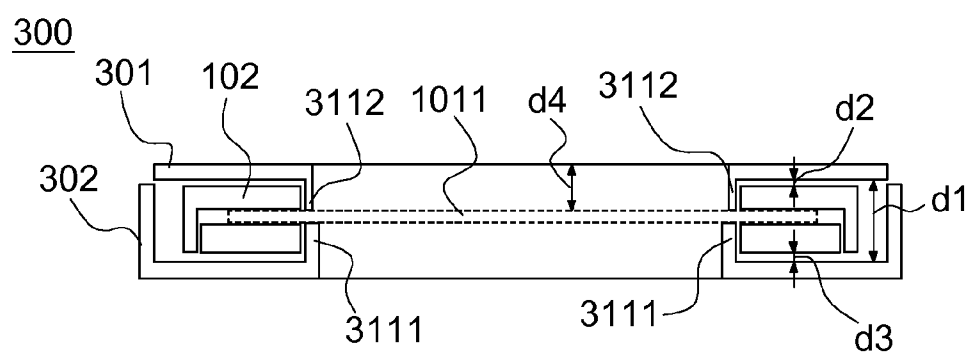
FIG. 4 shows a cross-sectional view along a line A-A of FIG. 3B.

Referring to FIG. 4, a cross-sectional view along a line A-A of FIG. 3B is shown. As indicated in the diagram, the accommodation region 305 formed by the first casing 301 and the second casing 302 has a thickness d1 larger than that of the holding portion 102. Since the object is fixed by way of retaining the scanning portion 1011 with the first positioning portion 3111 and the second positioning portion 3112, the distance d4 from the top surface of the scanning portion 1011 to the top surface of the fixing device 300 is constant. That is, the holding portion 102 is floating in the accommodation region 305 with one side of the holding portion 102 being separated from the first casing 301 by a distance d2 and the other side being separated from the second casing 302 by a distance d3.

Suppose the thickness of the fixing device 300 is 3.86 mm, and the fixing plane is exactly at a half of the thickness, so that the thickness d1 of the accommodation region 305 of the fixing device 300 is 3.44 mm. The distance between the two types of positive film holders, whose thicknesses are respectively 3.20 mm and 3.00 mm, and the distance between the first casing 301 and the second casing 302 are as follows. The holding portion of the former type of positive film holder is respectively separated from the first casing 301 by a distance d2 and separated from the second casing 302 by a distance d3, wherein d2=d3=0.11 mm. The holding portion of the latter type of positive film holder is respectively separated from the first casing 301 by a distance d2 and separated from the second casing 302 by a distance d3, wherein d2=d3=0.22 mm. The top surfaces of the two types of positive film holders are both separated from the top surface of the fixing device 300 by a distance d4, wherein d4 is a constant equal to 1.93 mm (the thickness of the positive film itself is not taken into consideration). Particularly, the range of the thickness d1 is between 3.4~4.5 mm and larger than the thickness of most positive film holders available in the market. Regardless what specification the positive film holder loaded in the fixing device 300 of the invention has, the positive film will be retained firmly by the upper flange and the lower flange. That is, the position of the positive film in the fixing device of the invention does not change regardless of the specification of the positive film holder. Nevertheless, the position of the fixing plane in the fixing device still can be adjusted according to the needs of image forming by the scanning element, and the invention is not limited thereto.

Figure 5A:
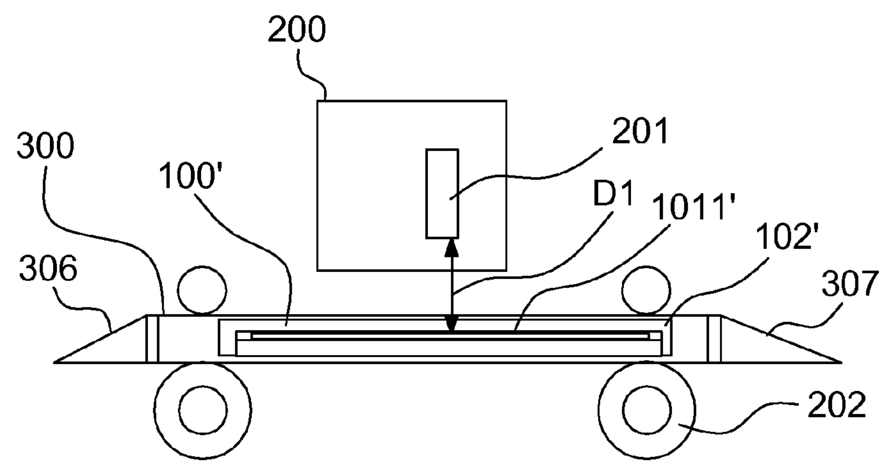
FIGS. 5A-5B are diagrams of scanning two positive film holders with different specifications using the fixing device of the invention.
Figure 5B:
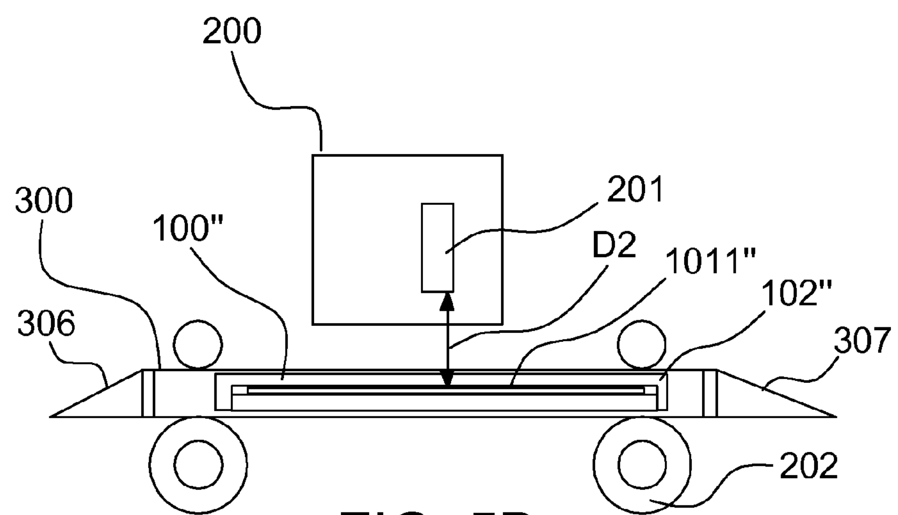

Referring to FIGS. 5A-5B, diagrams of scanning two positive film holders with different specifications using the fixing device of the invention are shown. As indicated in the diagram, the first positive film holder 100' includes a first scanning portion 1011' and a first holding portion 102'. The second positive film holder 100" includes a second scanning portion 1011" and a second holding portion 102". The thickness of the first holding portion 102' is not equal to that of the second holding portion 102". Scanning operation starts after the first positive film holder 100' is loaded into the fixing device 300. Meanwhile, the imaging element 201 of the scanning element 200 is separated from the first scanning portion 1011' by a first distance D1. Then, scanning operation starts after the second positive film holder 100" is loaded into the fixing device 300. Meanwhile, the scanning element 201 of the scanner 200 is separated from the second scanning portion 1011" by a second distance D2. Since the distance from the first scanning portion 1011' of the first positive film holder 100' to the surface of the fixing device 300 is equal to the distance from the second scanning portion 1011" of the second positive film holder 100" to the surface of the fixing device 300, the first distance D1 is equal to the second distance D2. Here, the first distance D1 and the second distance D2 both correspond to a focus distance of the scanning element 200 in which clear image is produced. That is, the first and the second scanning portions are both within the range of the field depth of the scanning element 200.

Furthermore, the two ends 306 and 307 of the fixing device 300 are bevel shaped, so that the lateral view of the fixing device 300 shows a wedge structure which facilitates the fixing device 300 to be inserted into the scanner for scanning.

The fixing device of the invention not only assists on the scanning of the positive film holders of different specifications but also assists on the scanning of sheet objects with different thicknesses. For example, in the scanning of sheet objects such as paper sheets, photos or films, the fixing device of the invention can be used for fixing the sheet objects, so that the scan plane of the object is always within the range of the field depth of the scanner and the scanned images is assured to have stable clarity.

Figure 6A:
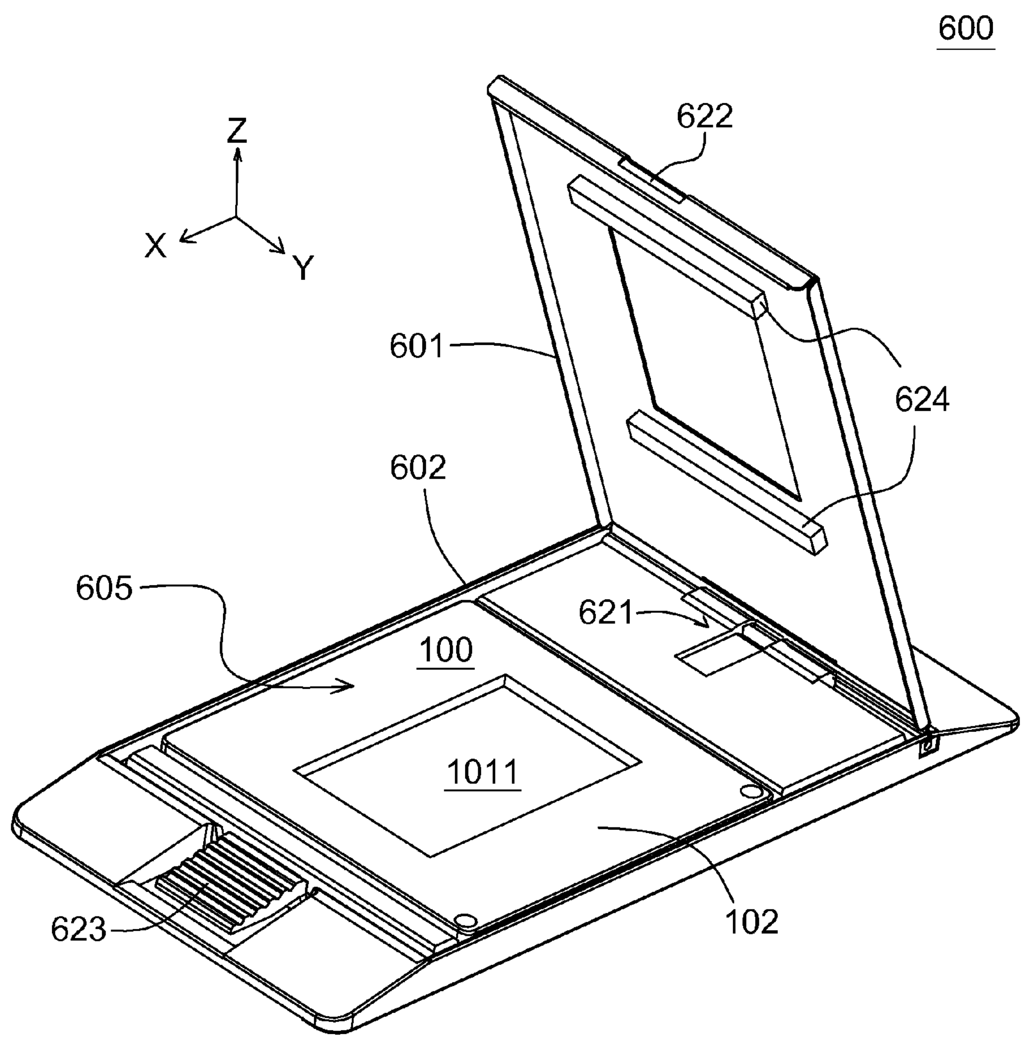
FIGS. 6A-6B are diagrams of a fixing device according to another embodiment of the invention.
Figure 6B:
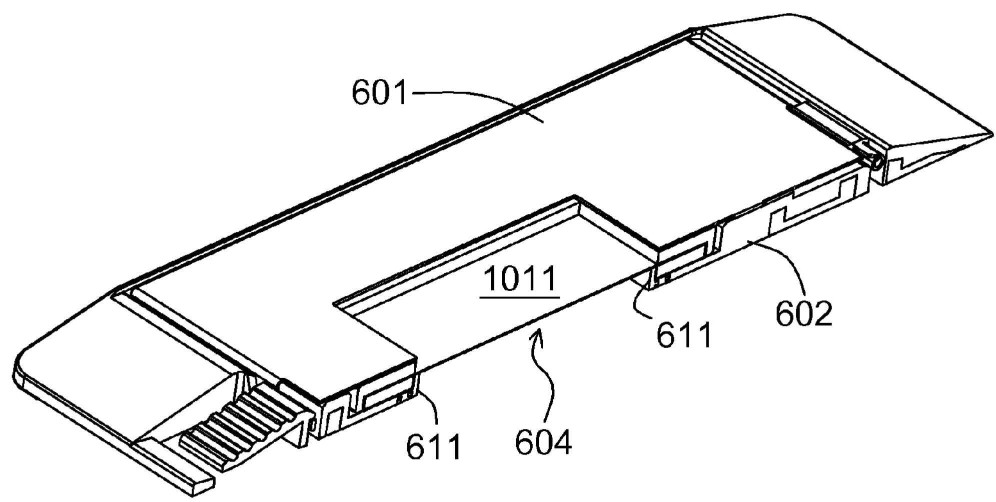

Referring to FIG. 6A and FIG. 6B, diagrams of a fixing device 600 according to another embodiment of the invention are shown. The fixing device 600 includes an accommodation region 605, a scan window 604 and a protrusion portion 611. The accommodation region 605 is for accommodating the holding portion 102 of the object 100. The scan window 604 is disposed in the accommodation region 605 for accommodating the scanning portion 1011 of the object 100. The protrusion portion 611 is disposed in the scan window 604 for positioning the scanning portion 1011 in a first direction Z perpendicular to the scan plane (the X-Y plane of FIG. 6). Here, the scan plane refers to the place on which the scanning portion 1011 is located after the object 100 is loaded into the fixing device. One side of the first casing 601 of the fixing device 600 is rotatably fixed on the second casing 602. In a practical application, an automatic ejection structure 621 is disposed on the one side and a lock structure 622 is disposed on the other side of the first casing 601. When the lock structure 622 works with a lock 623 disposed on the second casing 302, the fixing device 600 becomes a Siamese structure with great portability. When the user would like to use the fixing device, the user presses the lock 623, and the first casing 601 will be opened automatically by an elastic force. After the object is loaded from atop, the first casing 601 is closed and the second casing 602 is locked.

Preferably, the protrusion portion 611 is made from an elastic material, such as one of rubber, Teflon and elastic plastics, to avoid the object being damaged when the scanning portion is retained.

Furthermore, there is an elastic element 624 disposed on one side of the first casing 601 and within the accommodation region 605, and when the holding portion 102 is loaded in the accommodation region 605, the elastic element 624 elastically presses the holding portion 102. However, the position of the elastic element 624 is not limited to the exemplification in FIG. 6.

The structure of the fixing device of the invention is not limited to the flip-top structure as exemplified above, and can also be a separate type, a slide type or a plug-in type. For example, the first casing is detachably disposed on the second casing or slidably disposed on the second casing. Or, the first casing and the second casing are integrally formed in one piece, and there is a slot disposed on one lateral side of the fixing device through which the object is inserted into the fixing device along the scan plane.

Figure 7:
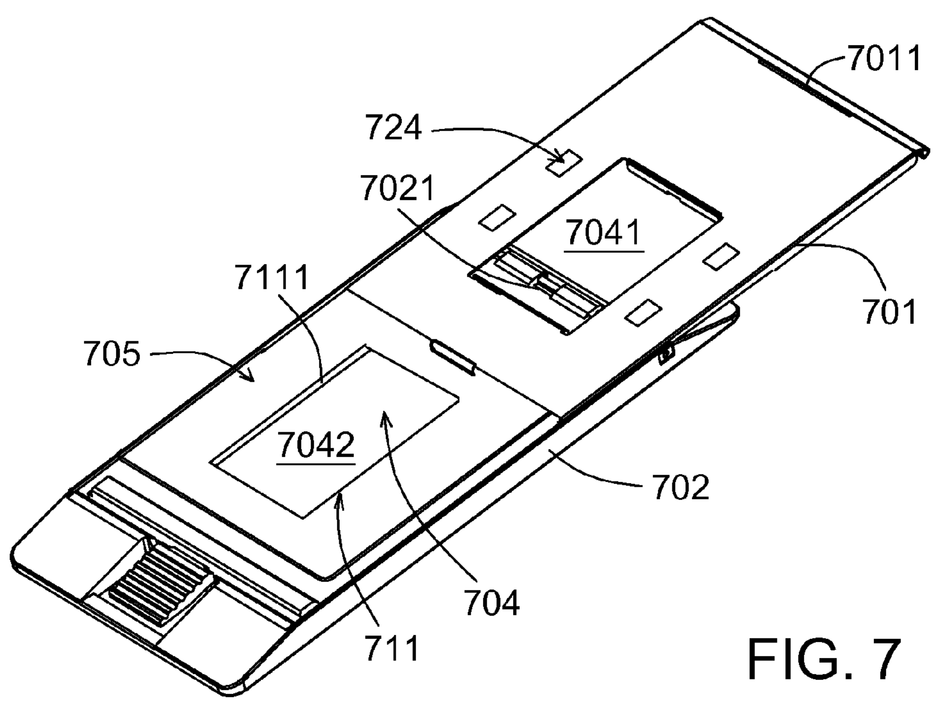
FIG. 7 shows a diagram of a fixing device according to yet another embodiment of the invention.

Referring to FIG. 7, a diagram of a fixing device 700 according to yet another embodiment of the invention is shown. The fixing device 700 includes an accommodation region 705, a scan window 704 and a protrusion portion 711. The scan window 704 is disposed in the accommodation region 705. The protrusion portion 711 is disposed in the scan window 704. The fixing device 700 has a first casing 701 and a second casing 702, which are arranged to form an accommodation region 705. The first casing 701 has a first opening 7041. The second casing 702 has a second opening 7042. The first opening 7041 and the second opening 7042 are stacked to form the scan window 704. Preferably, the protrusion portion 711 includes a first positioning portion 7111 disposed at the edge of the second opening 7042. When the holding portion of the object is loaded in the accommodation region 705, the scanning portion is correspondingly disposed in the scan window 704 and positioned by the first positioning portion 7111 in a first direction perpendicular to the scan plane. Here, the scan plane refers to the plane on which the scanning portion is located after the object is loaded to the fixing device.

Furthermore, there is an elastic element 724 disposed on one side of the first casing 701 and within the accommodation region 705, and when the holding portion is loaded in the accommodation region 705, the elastic element 724 elastically presses the holding portion. The height of the elastic element 724 preferably does not interfere with the movement of the first casing 701 with respect to the second casing 702, but allows the elastic element 724 to elastically press the holding portion, so that the scanning portion can tightly press the protrusion portion.

In a practical application, a pair of guide bars can be disposed on the outer walls of a pair of lateral sides of the first casing 701, and a pair of guide rails can be disposed on the inner walls of a pair of lateral sides of the second casing 702. The guide rails correspond to the guide bars, so that the first casing 701 can slide along the length direction of the lateral side, but the invention is not limited thereto. Also, one end of the first casing 701 has a hook 7011, and one end of the second casing 702 has a lock structure 7021 for cooperating with the hook 7011. When the first casing 701 slides to a particular position, the relative position between the first casing 701 and the second casing 702 is restricted by the cooperation of the lock structure 7021 and the hook 7011.

Figure 8A:
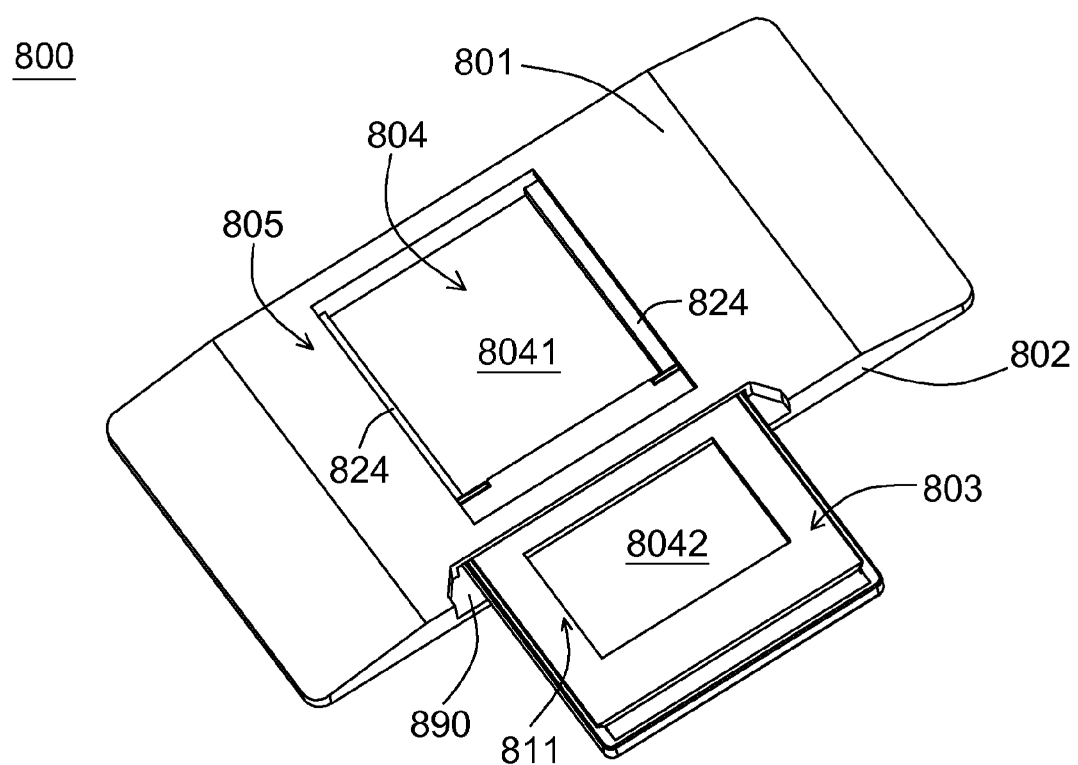
FIGS. 8A-8B are diagrams of a fixing device according to yet another embodiment of the invention.
Figure 8B:
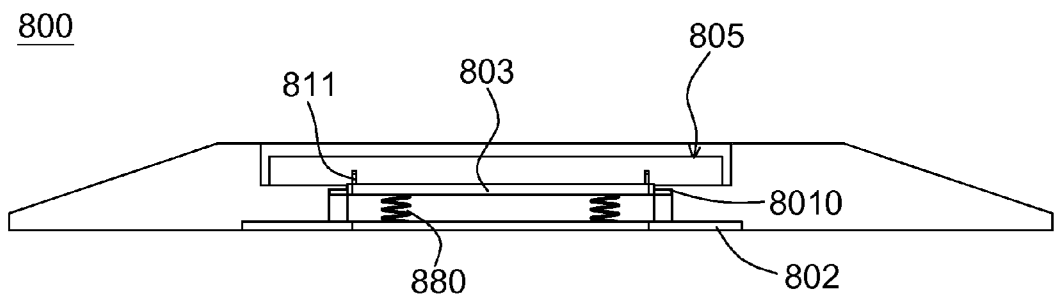
Figure 8C:
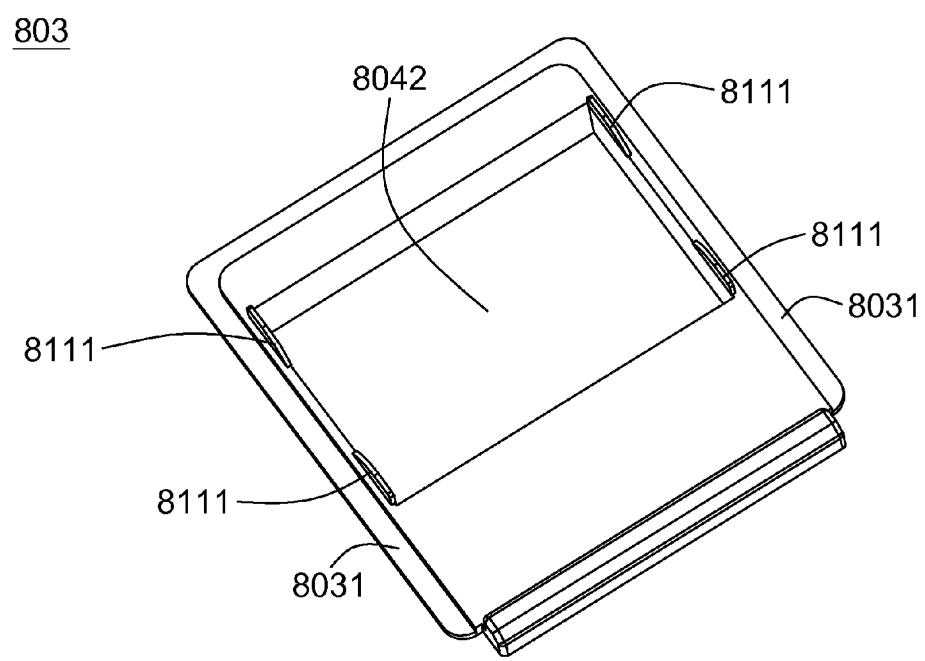
FIG. 8C shows a diagram of an embodiment of an under plate of FIG. 8A.

Referring to FIG. 8A and FIG. 8B, diagrams of a fixing device 800 according to yet another embodiment of the invention are shown. The fixing device 800 includes an accommodation region 805, a scan window 804 and a protrusion portion 811. The accommodation region 805 is for accommodating the holding portion of an object. The scan window 804 is disposed in the accommodation region 805 for accommodating the scanning portion of the object. The protrusion portion 811 is disposed in the scan window 804 for positioning the scanning portion in a first direction perpendicular to the scan plane. The fixing device 800 has a first casing 801 and a second casing 802 which are integrally formed in one piece. Moreover, there is a slot 890 disposed on a lateral side of the fixing device 800 through which the object is inserted into the fixing device along the scan plane. The fixing device 800 further includes an under plate 803. Referring to FIG. 8C, the first casing 801 and the under plate 803 together form an accommodation region 805. The first casing 801 has a first opening 8041. The under plate 803 has a second opening 8042. The first opening 8041 and the second opening 8042 are stacked to form the scan window 804. In the present embodiment, the protrusion portion 811 includes a first positioning portion 8111 disposed at the edge of the second opening 8042. When the holding portion is loaded in the accommodation region 805, the scanning portion is correspondingly disposed in the scan window 804 and positioned by the first positioning portion 8111 in the first direction.

Preferably, there is an elastic element 880 such as a set of springs disposed between the under plate 803 and the second casing 802. Since the first positioning portion 8111 is fixed on the under plate 803, the first positioning portion 8111 and the second casing 802 are elastically connected, making the position of the first positioning portion 8111 along the first direction easier to adjust.

When the plug-in type fixing device 800 is used, the positive film holder (like the holding portion) is inserted from a lateral side of the fixing device, and presses the under plate 803 downwards. When the positive film holder reaches a particular position in the fixing device, the under plate 803 is raised by a spring force coming from the bottom to support the positive film (like the scanning portion) of the positive film holder. Meanwhile, the raised height of the under plate 803 is restricted by the step surfaces 8031 at the two sides of the under plate 803. The step surface 8031 touches the corresponding surface 8010 on the first casing 801 and restricts the raised height of the under plate 803, hence controlling the position of the positive film in the first direction and assuring the focal point of the positive film in the scanning element.

Besides, the first casing 801 can have an elastic element 824 such as spring sheet or sponge on one side of the accommodation region 805. When the holding portion is loaded in the accommodation region, the elastic element 824 elastically presses the holding portion. The height of the elastic element 824 preferably does not interfere with the insertion of the object, but allows the elastic element 824 to elastically press the holding portion after the object is inserted, so that the scanning portion can tightly press on the protrusion portion.

The said fixing device can be used in a scanner, which further includes a scanning element. The scanning element can selectively scan a first object and a second object. The first object includes a first scanning portion and a first holding portion. The second object includes a second scanning portion and a second holding portion. The thickness of the first holding portion is not equal to that of the second holding portion. When the said fixing device fixes the first object, the first holding portion is loaded in the accommodation region, the first scanning portion is positioned by the protrusion portion in the first direction, and the scan plane of the first object is separated from the scanning element by a first distance in the first direction. When the fixing device fixes the second object, the second holding portion is loaded in the accommodation region, the second scanning portion is positioned by the protrusion portion in the first direction, and the scan plane of the second object is separated from the scanning element by a second distance in the first direction. The first distance and the second distance are both within the range of the field depth of the scanning element.

To summarize, when the scan assisting fixing device of the invention is used for the scanner to scan the objects with different thicknesses, the scan assisting fixing device can assure that the distance from the scan plane (such as a positive film inside the positive film holder) to the imaging surface of the scanner is close to a constant. In other words, such distance is always within the range of the field depth of the scanner, so that the scanner with small field depth still can obtain scanned images with stable quality, and can therefore be used in a wider range. Furthermore, when scanning an object such as a slide, the fixing device of the invention enables film holders with different thicknesses to be loaded into the fixing device and starts scanning accordingly without unloading the original film holder, which is convenient to the user and protective to the object.

While the invention has been described by way of example and in terms of the exemplary embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scan assisting fixing device for fixing an object to be scanned, which comprises a scanning portion and a holding portion, wherein the fixing device comprises:

an accommodation region for accommodating the holding portion;

a scan window disposed in the accommodation region for accommodating the scanning portion; and a protrusion portion disposed in the scan window for positioning the scanning portion in a first direction perpendicular to the scan plane, wherein the fixing device has a first casing and a second casing arranged together to form the accommodation region, the first casing has a first opening, the second casing has a second opening, and the first opening and the second opening are stacked to form the scan window.

2. The fixing device according to claim 1, wherein the protrusion portion comprises a first positioning portion disposed at the edge of the second opening, and when the holding portion is loaded in the accommodation region, the scanning portion correspondingly disposed in the scan window is positioned in the first direction by the scanning portion.

3. The fixing device according to claim 2, wherein the protrusion portion further comprises a second positioning portion disposed at the edge of the first opening, and when the holding portion is loaded in the accommodation region, the scanning portion correspondingly disposed in the scan window is retained and fixed by the first positioning portion and the second positioning portion.

4. The fixing device according to claim 2, wherein the first positioning portion and the second casing are elastically connected so that the portion of the first positioning is adjustable along the first direction.

5. The fixing device according to claim 2, wherein there is an elastic element disposed on one side of the first casing and within the accommodation region, and when the holding portion is loaded in the accommodation region, the elastic element elastically presses the holding portion.

6. The fixing device according to claim 1, wherein one side of the first casing is rotatably fixed on the second casing, or, the first casing is detachably disposed on the second casing, or, the first casing is slidably disposed on the second casing.

7. The fixing device according to claim 1, wherein the first casing and the second casing are integrally formed in one piece and there is a slot disposed on one lateral side of the fixing device through which the object is inserted into the fixing device along the scan plane.

8. The fixing device according to claim 1, wherein the protrusion portion is made from an elastic material.

9. The fixing device according to claim 1, wherein the scanning portion is a positive film, and the holding portion is a positive film holder for protecting the positive film.

10. A scanner, comprising:

a scanning element for selectively scanning a first object and a second object, wherein the first object comprises a first scanning portion and a first holding portion, the second object comprises a second scanning portion and a second holding portion, and a thickness of the first holding portion is not equal to that of the second holding portion; and a fixing device, comprising:

an accommodation region for accommodating the holding portion;

a scan window disposed in the accommodation region for accommodating the scanning portion; and a protrusion portion disposed in the scan window for positioning the scanning portion in a first direction perpendicular to the scan plane, wherein when the fixing device fixes the first object, the first holding portion is loaded in the accommodation region, the first scanning portion is positioned by the protrusion portion in the first direction, and a scan plane of the first object is separated from the scanning element by a first distance in the first direction; when the fixing device fixes the second object, the second holding portion is loaded in the accommodation region, the second scanning portion is positioned by the protrusion portion in the first direction, a scan plane of the second object is separated from the scanning element by a second distance in the first direction, and the first distance and the second distance are both within the range of a field depth of the scanning element, wherein the fixing device has a first casing and a second casing arranged together to form the accommodation region, the first casing has a first opening, the second casing has a second opening, and the first opening and the second opening are stacked to form the scan window.

11. The scanner according to claim 10, wherein the protrusion portion comprises a first positioning portion disposed at the edge of the second opening, and when the holding portion is loaded in the accommodation region, the scanning portion correspondingly disposed in the scan window is positioned in the first direction by the scanning portion.

12. The scanner according to claim 11, wherein the protrusion portion further comprises a second positioning portion disposed at the edge of the first opening, and when the holding portion is loaded in the accommodation region, the scanning portion correspondingly disposed in the scan window is retained and fixed by the first positioning portion and the second positioning portion.

13. The scanner according to claim 11, wherein the first positioning portion and the second casing are elastically connected so that the portion of the first positioning is adjustable along the first direction.

14. The scanner according to claim 11, wherein there is an elastic element disposed on one side of the first casing and within the accommodation region, and when the holding portion is loaded in the accommodation region, the elastic element elastically presses the holding portion.

15. The scanner according to claim 10, wherein one side of the first casing is rotatably fixed on the second casing, or, the first casing is detachably disposed on the second casing, or, the first casing is slidably disposed on the second casing.

16. The scanner according to claim 10, wherein the first casing and the second casing are integrally formed in one piece and there is a slot disposed on one lateral side of the fixing device through which the object is inserted into the fixing device along the scan plane.

17. The scanner according to claim 10, wherein the protrusion portion is made from an elastic material.

18. The scanner according to claim 10, wherein the scanning portion is a positive film, and the holding portion is a positive film holder for protecting the positive film.

* * * * *